United States Patent [19]
Grittman et al.

[11] Patent Number: 5,323,995
[45] Date of Patent: Jun. 28, 1994

[54] SUPPORT ASSEMBLY

[75] Inventors: Ronald L. Grittman, Menasha; Timothy G. Foster, Chilton, both of Wis.

[73] Assignee: Kaytee Products, Inc., Chilton, Wis.

[21] Appl. No.: 52,720

[22] Filed: Apr. 26, 1993

[51] Int. Cl.$^5$ .................................................. A01K 5/00
[52] U.S. Cl. ................... 248/309.2; 248/300; 248/317; 248/909; 119/57.8
[58] Field of Search .................. 248/309.1, 300, 909, 248/301, 308, 310, 324, 339, 309.2; 211/59.1; 119/18, 51 R, 26, 57.8

[56] References Cited

U.S. PATENT DOCUMENTS

| | | | |
|---|---|---|---|
| 1,525,401 | 2/1925 | King | 119/18 |
| 1,562,196 | 11/1925 | Abrams . | |
| 1,810,836 | 6/1931 | Laubenstein | 248/300 |
| 2,776,792 | 1/1957 | Pearson . | |
| 2,985,006 | 5/1961 | Du Bois | 70/458 |
| 3,224,715 | 12/1965 | Maggiore | 248/301 |
| 3,329,127 | 7/1967 | Cordis | 119/18 |
| 3,895,769 | 7/1975 | Hagaman | 248/300 X |
| 4,061,092 | 12/1977 | Jacobsen et al. | 248/300 X |
| 4,176,423 | 12/1979 | Wigemark | 16/125 |
| 4,746,780 | 5/1988 | Resh | 248/300 X |
| 4,884,837 | 12/1989 | Nakazawa | 294/158 |
| 4,893,773 | 1/1990 | Fujimoto | 248/300 X |
| 5,033,708 | 7/1991 | Brue et al. | 248/309.2 |
| 5,064,162 | 11/1991 | Jondelius | 248/300 X |

FOREIGN PATENT DOCUMENTS 2851297 6/1979 Fed. Rep. of Germany ........ 119/18

Primary Examiner—David A. Scherbel
Assistant Examiner—Korie H. Chan
Attorney, Agent, or Firm—Godfrey & Kahn

[57] ABSTRACT

A support assembly for an object of interest which includes a stem which has a first portion which has a substantially uniform width dimension, and a second portion which has an increased width dimension in relative comparison to the first portion; a suspension member movably secured on the first end of the stem and having a width dimension which is substantially equal to, or less than, the width dimension of the second portion of the stem, and a support tab movably secured on the second end of the stem, and wherein the support tab is moveable along a path of travel from a first position, wherein the support tab is oriented in a substantially coplanar orientation relative to the stem, to a second position wherein the main body is oriented in a substantially angulated relationship relative to the stem to support the object of interest.

12 Claims, 2 Drawing Sheets

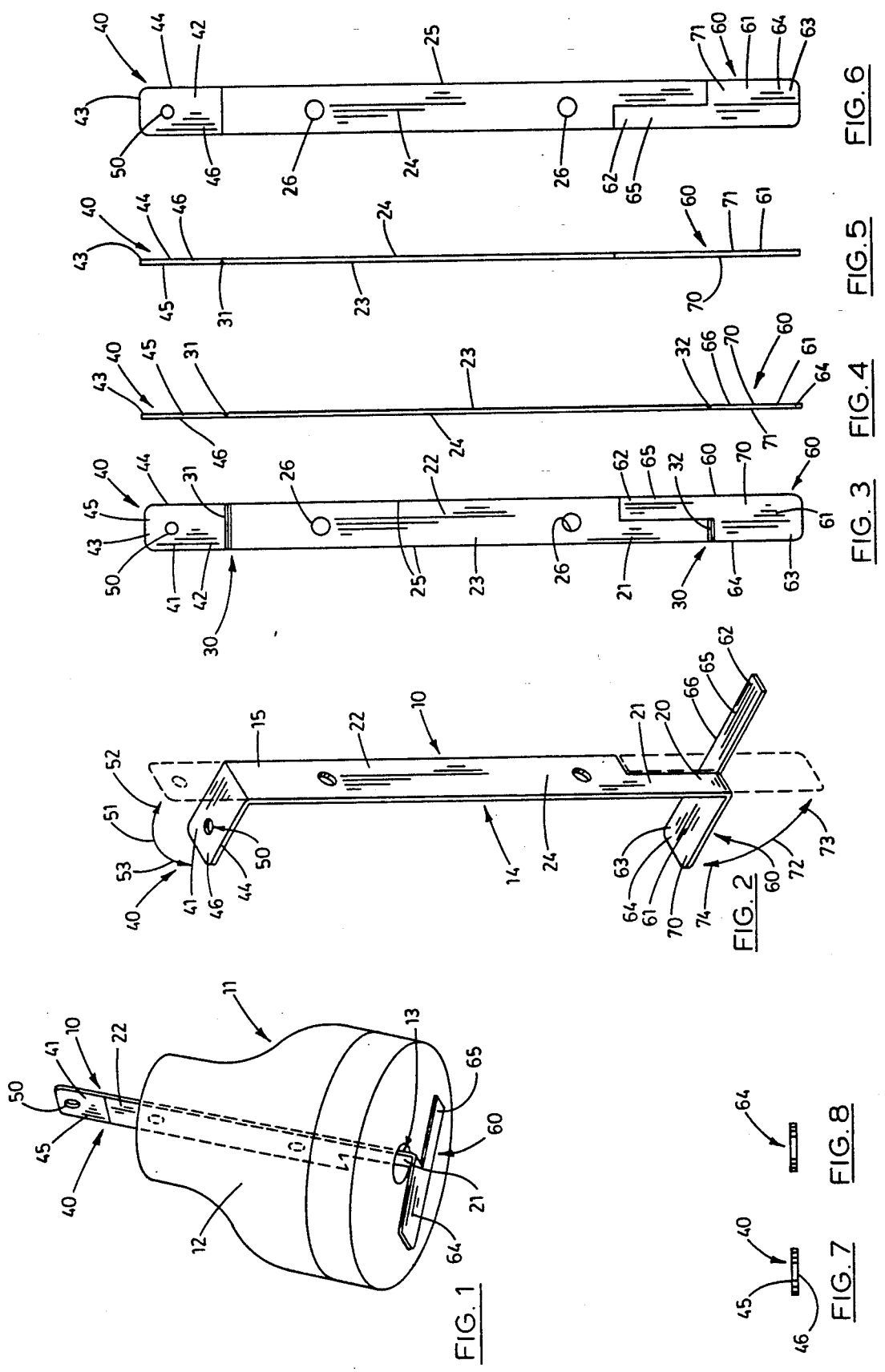

SUPPORT ASSEMBLY

BACKGROUND OF THE INVENTION

1. Field of the Invention:

The present invention relates to a support assembly for suspending an article of interest and the like from a supporting structure, and more particularly to an apparatus which is operative to support a source of small animal food such as that which would be provided for birds, squirrels or the like.

2. Description of the Prior Art:

Bird watching is a very popular pastime in the United States. Over the years, many wild bird enthusiasts have experimented with various seed formulations in order to attract specific species of wild birds. Furthermore, it has been the widespread practice of many homeowners to provide bird feeders and other sources of food for native wild birds throughout the year.

Manufactures of small animal food have for some time produced products which may be suspended from tree branches or the like, and which may be eaten by squirrels and birds. Until quite recently, no convenient, and/or inexpensive method had been devised to suspend these small animal food products apart from the obvious methods of utilizing net-like containers and other more elaborate structures such as shown in U.S. Pat. No. 5,033,708 which is incorporated by reference herein.

While the prior art devices and practices, including the device shown in the above-referenced patent, have operated with varying degrees of success, they are unsatisfactory in one or more respects. For example, some of the prior art devices and practices are cumbersome, difficult to manufacture, or present problems with respect to retaining them in an appropriate, suspended or supported position on an object, such as a tree branch; or otherwise do not admit to convenient easy deployment in other environments. Furthermore, some of these same devices are manufactured from materials which may be ingested by the animals who are feeding on same. Yet another deficiency with the prior art devices and practices are their obvious inability to be manufactured and sold at a relatively nominal price.

Therefore, it has long been known that it would desirable to have a support assembly that is capable of positioning an object of interest, such as a source of small animal food in a desired position, for the purpose of exposing the object of interest for consumption by small animals, or for point of purchase display, and which is capable of performing a variety of other useful functions, the device being both inexpensive to manufacture and sell, and relatively easy to employ.

OBJECTS AND SUMMARY OF INVENTION

Therefore, it is an object of the present invention to provide an improved support assembly for suspending an object of interest, such as a source of small animal food, and the like.

Another object of the present invention is to provide a support assembly which is operable to obtain the benefits to be derived from the prior art apparatuses, and other practices, while avoiding the detriments individually associated therewith.

Another object of the present invention is to provide a support assembly which includes a support tab which is moveable along a path of travel and into a position or orientation where it engages, and supports, the object of interest thereby permitting the object of interest to be suspended therefrom.

Another object of the present invention is to provide a support assembly which includes a main body having opposite ends, and wherein a suspension member is secured on one end of the main body, and the support tab is movably secured on the opposite end thereof.

Another object of the present invention is to provide a support assembly which is characterized by ease of deployment, simplicity of construction, and which further can be sold at a relatively nominal price.

Further objects and advantages are to provide improved elements and arrangements thereof, in a support assembly for the purposes described which is dependable, economical, durable, and fully effective in accomplishing its intended purposes.

These and other objects and advantages are achieved in a support assembly for an object of interest such as a source of small animal food, and which has a passageway formed therein, and wherein the passageway has a predetermined length and diametral dimension, and wherein the support assembly includes a main body having a first end, and an opposite second end, and wherein the main body has a length dimension which is greater than the length dimension of the passageway formed in the object of interest, and a width dimension which is less than the width dimension of the passageway formed in the object of interest; a suspension member secured on the first end of the main body and being moveable from a first position, wherein the suspension member is oriented in a substantially coplanar position relative to the main body, to a second position, wherein the suspension member is oriented in angulated relation thereto; a support tab secured on the second end of the main body and moveable from a first position, wherein the support tab is oriented in a substantially coplanar position relative to the main body, to a second position, wherein the support tab is oriented in substantially normal relation relative thereto, and wherein the support tab has a length dimension greater than the diametral dimension of the passageway formed in the object of interest, and wherein, in use, the suspension member, and the main body are oriented in a substantially coplanar orientation one to the other, and are received through the passageway formed in the object of interest, and wherein the support tab when located in the second position engages the object of interest thereby permitting the object of interest to be suspended by the main body by means of the suspension member.

BRIEF DESCRIPTION OF THE DRAWINGS

FIG. 1 is a perspective, environmental view of the present invention and showing the support assembly suspending a source of small animal food such as a bell-shaped birdseed food product.

FIG. 2 is a somewhat enlarged perspective view of the support assembly of the present invention.

FIG. 3 is a somewhat enlarged, top plan view of the support assembly of the present invention.

FIG. 4 is a left side elevation view of the support assembly of the present invention.

FIG. 5 is a right side elevation view of the support assembly of the present invention.

FIG. 6 is a bottom plan view of the support assembly of the present invention.

FIG. 7 is an end view of the support assembly of the present invention.

FIG. 8 is an end view opposite to that shown FIG. 7.

DESCRIPTION OF THE PREFERRED EMBODIMENT

Figure 9:
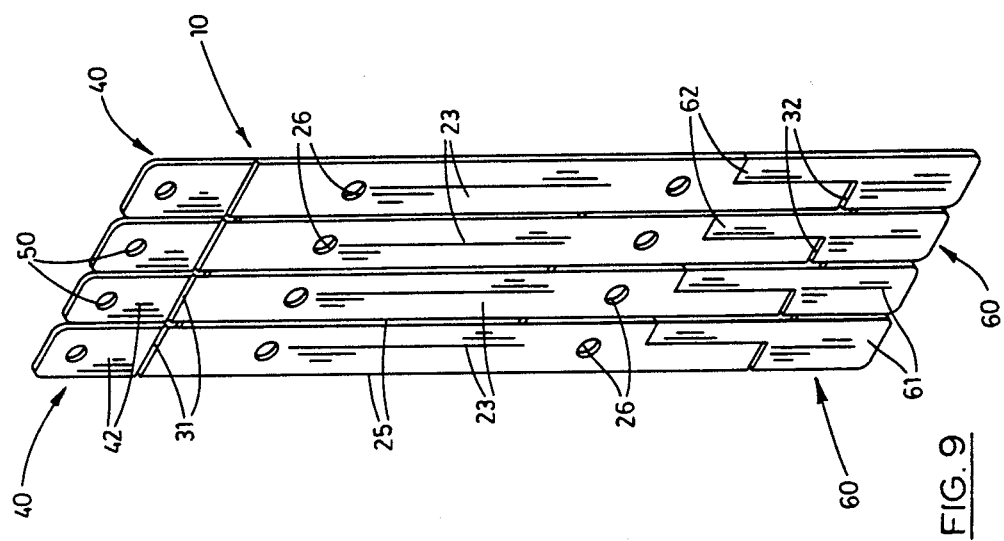
FIG. 9 is top plan view of a plurality of the support assemblies formed into a belt.

Referring more particularly to the drawings, the support assembly of the present invention is designated generally by the numeral 10 in FIG. 1. As shown therein the apparatus is operable to support an object of interest 11 which may take on the form of a source of small animal food such as the bell-shaped birdseed product 12. The support assembly 10 is operable to position the object of interest 11 in a selected, suspended position or attitude relative to another supporting surface or structure such as a branch of a tree, or other assembly (not shown).

For illustrative convenience only, the support assembly of the present invention is shown and described herein as it would be configured if it were utilized to support a source of small animal food such as the birdseed product 12, which is shown in FIG. 1. However, it should be recognized that the apparatus of the present invention can be utilized in a variety of different environments for purposes of displaying or supporting various objects of interest for various commercial purposes.

As best seen by reference to FIG. 1, a passageway 13 is formed in the bell-shaped birdseed product 12. The passageway has predetermined length and diametral dimensions. As best seen in FIG. 1, the support assembly 10 is operable to be slidably received through the passageway, and positioned in a fashion such that the object of interest rests on, or is engaged by a support tab which will be discussed in further detail hereinafter.

As best seen by reference to FIG. 2, the support assembly of the present invention includes a substantially rectangularly shaped, and planar main body, or stem 14, having a first end 15 and an opposite second end 20. Further, the stem has a first portion 21 which has predetermined length and width dimensions, and a second portion 22 which has predetermined length and width dimensions which are greater than those of the first portion. As best seen by reference to FIG. 3, the width dimension of the first portion is approximately one-half that of the width dimension of the second portion. The stem further includes top and bottom surfaces 23 and 24, and the stem is further defined by a peripheral edge which is generally indicated by the numeral 25. As best seen by reference to FIGS. 4 and 6, a pair of apertures 26 are formed in the stem and are operable to be engaged by a manufacturing machine when these same devices 10 are advanced in a belt-like fashion along a production line (FIG. 9). As best seen by reference to FIGS. 2 and 3, a pair of substantially linear scores, or notches 30 are formed in the top surface of the support assembly 10. The pair of scores include a first scored edge, and a second scored edge 31 and 32, respectively.

As best illustrated by reference to FIGS. 2 and 3, the support assembly 10 includes a suspension member 40 which is made integral with the first scored edge 31. The suspension member has a main body 41, having a first end 42, and an opposite, second end 43. The main body 41 is defined by a peripheral edge 44. Additionally, the main body has a top surface 45 and an opposite, bottom surface 46. As best seen in FIG. 3, an aperture 50 is formed in the main body 41 and provides a convenient means whereby the support assembly 10 may be engaged by a fastener such as a nail, or screw, or by other objects such as a wire or string. This, of course, provides a convenient means by which the support assembly may be suspended from another object such as a tree branch, bird feeder or the like, not shown. The suspension member 40 is operable to move along a path of travel which is generally indicated by the numeral 51, from a first position 52, wherein it is disposed in substantially coplanar relation relative to the stem 14, to a second position 53, where it is disposed in angulated relation relative thereto. As will be recognized the suspension member is moveable about the first scored edge 31. As should be understood, the suspension member is moveable to the second position 53 to permit the birdseed product 12 to be conveniently packaged. The main body of the suspension member 40 has predetermined length and width dimensions. The width dimension of the suspension member is equal to, or less than the width dimension of the corresponding first end 15 of the stem 14.

Made integral with the second end 20, of the stem 14 is a support tab which is generally indicated by the numeral 60. The support tab includes a main body 61 having a first end 62, and an opposite end 63. Further the main body 61 has a first portion 64, which has a predetermined width dimension which is substantially equal to the width dimension of the second portion 22 of the stem 14. This relationship is best seen in FIGS. 3 and 6. The main body 61 also has a second portion 65, which has a reduced width dimension in relative comparison to the first portion. In particular, this second portion has a width dimension which is approximately one-half that of the width dimension of the first portion 64, and is substantially equal to the width dimension of the first portion 21 of the stem 14. This relationship is best seen in FIG. 3. As will be recognized by a study of the drawings, the length dimension of the first portion 21 of the stem 14 is substantially equal to one-half of the length dimension of the main body 61. The main body 61 further is defined by a peripheral edge 66. The support tab additionally has a top surface 70 which is operable to support the object of interest such as the birdseed product 12, and an opposite bottom surface 71. As best seen by reference to FIG. 2, the support tab 60 is operable to move along a path of travel 72 from a first position of 73, wherein the support tab is disposed in a substantially coplanar relationship relative to the stem 14, to a second position, 74, wherein the support tab is disposed in an angulated relation relative thereto and operable to engage the object of interest 11.

OPERATION

The operation of the described embodiment of the present invention is believed to be readily apparent and is briefly summarized at this point.

A support assembly 10 for positioning an object of interest 11 in a desired attitude is best seen by reference to FIGS. 1 and 2, respectively. As shown therein, the support assembly 10 includes a stem 14 which has opposite first and second ends 15 and 20, and wherein the stem has a first portion 21 which has a substantially uniform width dimension, and a second portion 22 which has a increased width dimension, in relative comparison to the first portion. The support assembly 10 further includes a suspension member 40 which is made integral with stem, and which is movably secured on the first end 15 thereof. The suspension member has a width dimension which is substantially equal to, or less than the second portion of the stem. A support tab 60 is movably secured on the second end 20 of the stem. The support tab has a main body 61 having a predetermined length dimension and opposite ends 62 and 63, respectively, and wherein the main body 61 has a first portion 64 having a predetermined width dimension which is substantially equal to, or less than, the width dimension of the second portion 22 of the stem 14. The support tab has a second portion 65 which has a reduced width dimension in relative comparison to the first portion 64 of the main body 61. The main body 61 of the support tab 60 is movably secured on the second end 70 of the stem 14 at a location intermediate the opposite ends thereof. The support tab 60 is moveable from a first position 73, wherein the main body 61 is oriented in a substantially coplanar orientation relative to the stem 14, to a second position 74 wherein the main body is oriented in angulated relation relative thereto. As best seen by reference to FIG. 6, the length dimension of the second portion 65 of the support tab 60 is approximately equal to the length dimension of the first portion 21 of the stem 14.

When disposed in the second position 74, the support tab 60 is operable to engage an object of interest 11 such as a bell-shaped birdseed product 12 thereby orienting the object on and about the stem 14 for consumption by birds, squirrels, etc.

As will be recognized, the suspension member 40 and support tab 60 are moveable along their respective paths of travel by means of flexing about the first and second scored edges 31 and 32 respectively. The stem is manufactured from a synthetic, polymeric based and recyclable substrate. Further, the support assemblies 10 can be manufactured as a continuous belt which facilitates the manufacturing of the birdseed product. This is best seen in FIG. 9.

As noted earlier, the present invention can be installed on a wide variety of different supporting structures. Additionally, the present device is easy to utilize, recyclable, and can be manufactured at a nominal price as compared with other prior art devices which are used for similar purposes.

Although the invention has been herein shown and described in what is conceived to be the most practical and preferred embodiment, it should be recognized that departures may be made therefrom within the scope of the invention which is not to be limited to the illustrative details disclosed.

Having described and illustrated my new invention, What I claim as new and desire to secure by Letters Patent is:

1. A support assembly in combination with an animal food stuff and wherein the animal food stuff has a passageway formed therein which has predetermined length and cross sectional dimensions, the support assembly comprising:

a stem having opposite first and second ends and wherein the stem has a first portion which is substantially rectangularly shaped, and which further has a predetermined width dimension, and a second portion which has an increased width dimension in relative comparison to the first portion, and wherein the first and second portions are substantially linearly aligned and the second portion has a width dimension less than cross-sectional dimension of the passageway formed in the animal food stuff; and a support tab movably secured on the second end of the stem, and wherein the support tab has a main body having a predetermined length dimension which is greater than the cross sectional dimension of the passageway formed in the animal food stuff, and opposite ends, and wherein the main body has a first portion having a substantially rectangular shape and a predetermined width dimension which is substantially equal to the width dimension of the second portion of the stem, and a second portion which has a substantially rectangular shape and a reduced width dimension in relative comparison to the first portion of the main body, the first and second portions of the support tab disposed in substantial alignment with each other, and wherein the main body of the support tab is movably secured on the second end of the stem at a location substantially intermediate its opposite ends, and wherein the main body of the support tab is moveable from a first position wherein the main body is oriented in a substantially coplanar and coaxial orientation relative to the stem, to a second position wherein the main body is oriented in a substantially perpendicular relation relative to the stem, and wherein the stem is received through the passageway formed in the animal food stuff, and the support tab, when oriented in the second position, is operable to engage the animal food stuff, thereby permitting the animal food stuff to be suspended by means of the stem in a predetermined orientation.

2. A support assembly as claimed in claim 1 and wherein the support assembly further includes a suspension member having predetermined length and width dimensions, the suspension member movably secured on the first end of the stem and having a width dimension which is substantially equal to or less than the second portion of the stem.

3. A support assembly as claimed in claim 2, and wherein the suspension member is moveable from a first position wherein the suspension member is oriented in a substantially coplanar relation relative to the stem, to a second position wherein the suspension member is oriented in angulated relation relative thereto.

4. A support assembly as claimed in claim 3, and wherein the first portion of the stem has a width dimension which is approximately one-half the width dimension of the second portion of the stem, and wherein the width dimension of the second portion of the support tab is substantially equal to the width dimension of the first portion of the stem.

5. A support assembly as claimed in claim 4, and wherein the first portion of the stem, and the second portion of the support tab have individual length dimensions which are substantially equal.

6. A support assembly as claimed in claim 5, and wherein an aperture is formed in the suspension assembly, and wherein the length dimensions of the first and second portions of the support tab are substantially equal.

7. A support assembly in combination with an animal food stuff having a passageway of predetermined length and cross sectional dimensions, the support assembly comprising:

a stem having a first end, and an opposite, second end, and wherein the stem has a length dimension greater than the length dimension of the passageway, and wherein the stem has a first portion which is substantially rectangularly shaped, and which further has a predetermined width dimension, and a second portion which has an increased width dimension in relative comparison to the first portion, and wherein the first and second portions are substantially linearly aligned and the second portion has a width dimension less than cross-sectional dimension of the passageway formed in the animal food stuff; and a support tab movably secured on the second end of the stem, the support tab having a main body with opposite ends and a length dimension which is greater than the diametral dimension of the passageway, and wherein the main body has a first portion having a substantially rectangular shape and a predetermined width dimension which is substantially equal to the width dimension of the second portion of the stem, and a second portion which has a substantially rectangular shape and a reduced width dimension in relative comparison to the first portion of the main body, the first and second portions of the support tab disposed in substantial alignment with each other, and wherein the main body of the support tab is movably secured on the second end of the stem at a location substantially intermediate the opposite ends of the main body, and wherein the support tab is moveable from a first position wherein the main body of the support tab is oriented in a substantially coplanar and coaxial position relative to the stem, to a second position, wherein the main body of the support tab is oriented in a substantially normal orientation relative thereto, and wherein the stem is received through the passageway formed in the animal food stuff, and the main body of the support tab when located in the second position engages the animal food stuff, thereby permitting the animal food stuff to be suspended from the first end of the stem.

8. A support assembly as claimed in claim 7, and wherein a suspension member is movably secured on the first end of the stem and is moveable from a first position, wherein the suspension member is oriented in a substantially coplanar position relative to the stem, to a second position, wherein the suspension member is oriented in angulated relation relative thereto, and wherein the suspension member has a width dimension which is equal to or less than the width dimension of the stem.

9. A support assembly as claimed in claim 8, and wherein the first portion of the stem has a length dimension less than the second portion, and a width dimension which is approximately one-half the width of the second portion, and wherein the width dimension of the suspension member is less than or equal to the width dimension of the second portion of the stem.

10. A support assembly as claimed in claim 9, and wherein the width dimension of the second portion of the support tab is substantially equal to or less than the width dimension of the first portion of the stem.

11. A support assembly as claimed in claim 10, and wherein the length dimensions of the first and second portions of the support tab are substantially equal, and the length dimension of the first portion of the stem, and second portion of support tab are substantially equal.

12. A support assembly in combination with an animal food stuff which has a passageway formed therein, and wherein the passageway has predetermined length and diametral dimensions, the support assembly comprising:

a stem having a first end, and an opposite, second end, and wherein the stem has a length dimension which is greater than length dimension of the passageway, and wherein the stem has a first portion which is substantially rectangularly shaped, and which further has a predetermined width dimension, and a second portion which has an increased width dimension in relative comparison to the first portion, and wherein the first and second portions are substantially linearly aligned and the second portion has a width dimension less than cross-sectional dimension of the passageway formed in the animal food stuff;

a suspension member movably secure on the first end of the stem and being moveable from a first position, wherein the suspension member is oriented in a substantially coplanar relation relative to the stem, to a second position, wherein the suspension member is oriented in angulated relation relative thereto; and a support tab movably secured on the second end of the stem and having a main body with opposite ends, and wherein the main body has a first portion having a substantially rectangular shape and a predetermined width dimension which is substantially equal to the width dimension of the second portion of the stem, and a second portion which has a substantially rectangular shape and a reduced width dimension in relative comparison to the first portion of the main body, the first and second portions of the support tab disposed in substantial alignment with each other, and wherein the main body of the support tab is moveable between a first position wherein the support tab is oriented in a substantially coplanar and coaxial relation relative to the stem, to a second position, wherein the support tab is oriented in substantially normal relation relative thereto, and wherein the support tab has a length dimension greater than the diametral dimension of the passageway, and where in use, the suspension assembly and stem are oriented in substantially coplanar orientation and are received through the passageway formed in the animal food stuff, and wherein the support tab, when located in the second position, is operable to engage and support the animal food stuff on the stem, the animal food stuff being suspended from the suspension member.

* * * * *